United States Patent
Bays

[15] 3,676,840
[45] July 11, 1972

[54] UNDERWATER SEISMIC ACOUSTIC ENERGY SIGNAL SOURCE

[72] Inventor: Marvin G. Bays, Jackson, Miss.

[73] Assignee: Delta Exploration Company, Inc., Jackson, Miss.

[22] Filed: Sept. 9, 1970

[21] Appl. No.: 70,794

[52] U.S. Cl. .................................................340/12, 310/8.9
[51] Int. Cl. .........................................................H04b 11/00
[58] Field of Search ................340/14, 12, 8 R, 8 C, 8 D, 340/8 L, 8 FT, 8 MM, 8 LT, 8 PC, 9, 10, 11; 310/8.9

[56] References Cited

UNITED STATES PATENTS

| | | | |
|---|---|---|---|
| 3,392,369 | 7/1968 | Dickie et al. | 340/8 R X |
| 3,394,775 | 7/1968 | Cole et al. | 340/12 R X |
| 2,434,900 | 1/1948 | Black, Jr. et al. | 340/8 LF |
| 1,667,418 | 4/1928 | Hahnemann et al. | 340/8 R |

Primary Examiner—Benjamin A. Borchelt
Assistant Examiner—H. J. Tudor
Attorney—Mason, Fenwick & Lawrence

[57] ABSTRACT

An acoustic signal means is provided with two signal radiating hollow shell members which are connected by a hydraulic cylinder for outward relative movement with an inflatable toroidal connector member connecting circular edges of the shell members to define a main interior chamber with the shell members and pressure regulating means for maintaining pressure on the interior of the toroidal member at a level slightly higher than the maximum pressure differential between the main interior chamber and the external environment and also having pressure regulating means for maintaining an average pressure in the internal chamber substantially equal to the external pressure.

13 Claims, 2 Drawing Figures

Patented July 11, 1972
3,676,840
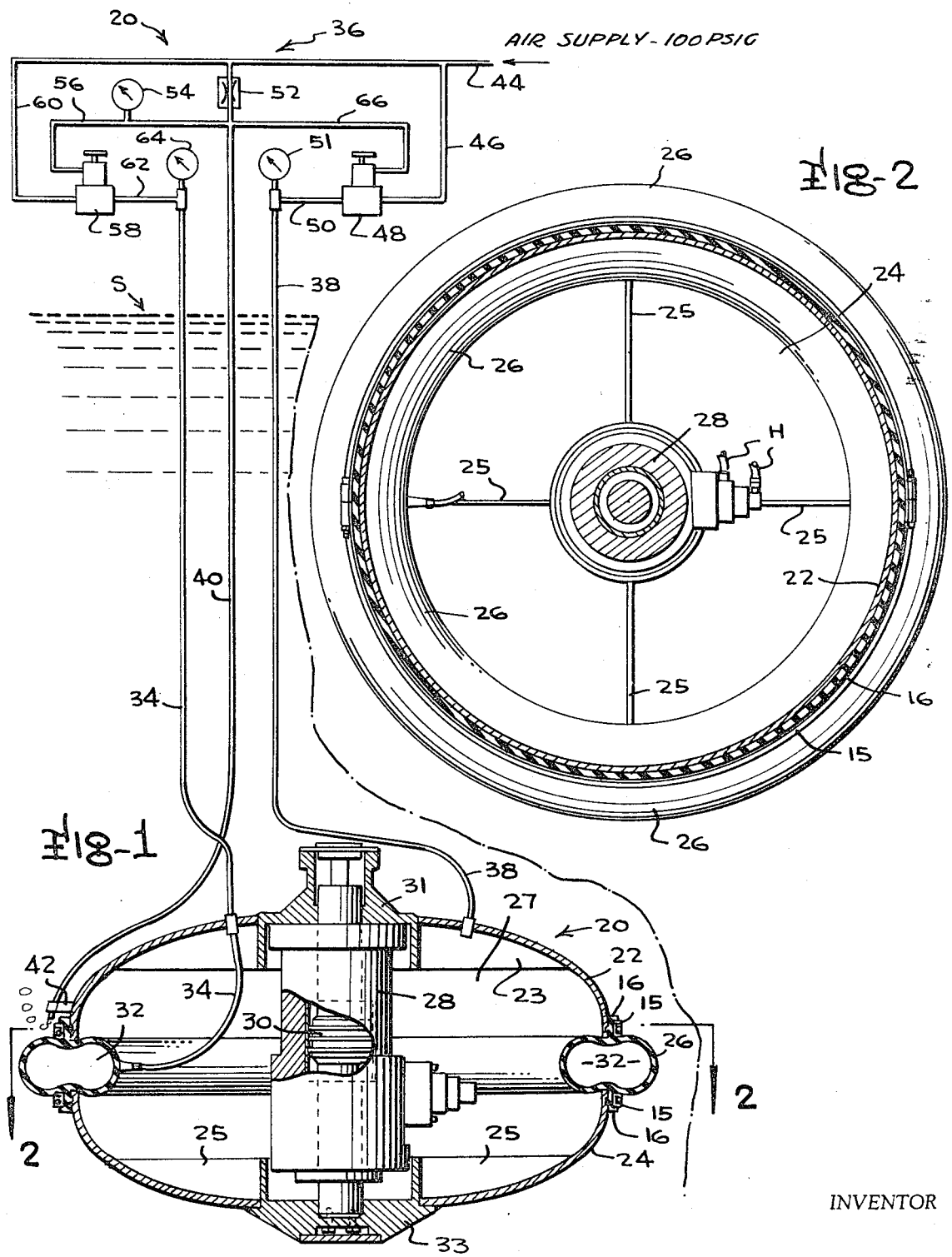

UNDERWATER SEISMIC ACOUSTIC ENERGY SIGNAL SOURCE

This invention is in the field of signal providing means and is specifically directed to a new and improved acoustical signal source for use in underwater seismic exploration. Moreover, the invention is, more specifically, directed to new and improved acoustic energy signal sources of the type comprising first and second acoustic energy radiating members that are forcefully driven apart by a power means connecting the members.

The geophysical exploration industry has long recognized the need for acoustic energy signal sources which would provide signals within the band of frequencies normally employed for seismic energy exploration having a minimum of distortion while providing maximum signal strength. It has been found that the positioning of an acoustic energy signal providing source beneath the surface of the body of water in which it is being used a distance equal to one-fourth the wave length of the midband frequency being created results in an amplification phenomenon known as wave reinforcement due to the in phase relationship of the succeeding waves. In actual practice, the water depth of the signal producing transducer is normally maintained at 40 feet if the body of water is sufficiently deep to permit such operation.

Unfortunately, the prior known acoustic energy providing devices has suffered from a number of deficiencies which have heretofore remained uncorrected. For example, a number of the prior known devices employed a radiating piston vibrator type member in which a piston is connected to a displaceable body member forming one part of the wall of a main interior chamber that is normally filled with a low impedance media such as air. The main interior chamber must be large enough to prevent excessive air pressure fluctuation on the interior of the chamber during the volume changes of the chamber occasioned by operation of the piston. Additionally, such devices of this type are normally operated at a depth of 40 feet below the surface which creates an additional pressure of 17.8 pounds per square inch on the outer surface of the device, the air pressure inside the chamber must be maintained at a level very nearly the same as the water pressure at that depth; otherwise, a distortion of the radiated wave form will occur. Since the effective area of the signal radiating body member can be quite considerable, any such small differential pressure between the air pressure in the main interior chamber and the external water pressure can create an appreciable difference in the forces acting against the body member. This force differential causes a difference in acceleration rate of the body member when the piston is actuated and, therefore, creates a distorted unsymetrical output pressure waVe form. Such distorted wave forms from the source signal are extremely undesirable for obvious reasons and greatly lessens the value of the geophysical data recovered by the overall system.

Prior known devices of this general type such as shown in U.S. Pat. No. 3,394,775 have normally connected the movable signal providing body member to the remainder of the structure by a simple, solid, flexible rubber connector seal means having sufficient flexibility to permit the movement of the body member through its desired stroke with respect to the actuator means with the maximum stroke movement being of the order of 5 inches. Since the normal pressure variations across the seal between the internal main chamber and the water in which the device is located may be of the order of 14 or more pounds per square inch, the flexible connector member connecting the radiating member and the actuator must have substantial strength to resist such movement. Consequently, the prior known designs have required an internal air chamber pressure greater than the maximum pressure variations plus the pressure due to water head in order to prevent frequently occurring seal failure. This higher than average internal air pressure causes output pressure wave form distortion that is extremely undesirable.

Therefore, it is the primary object of this invention to provide a new and improved acoustic energy signal source.

Obtainment of the object of this invention is enabled through the provision of a flexible connecting member connecting two body shell members between which is located a main internal chamber and one or both of which are movable away from the other for creating an acoustical signal. The connecting means is in the form of a hollow inflatable torus having an internal chamber that is pressurized to a pressure that is always greater than the maximum pressure differential across the connector from the external environment to the main internal chamber. Consequently, the inflatable toroidal member of the preferred embodiment of this invention allows the main internal air chamber to be operated at an average pressure approximately equal to the average outside pressure to consequently eliminate the output pressure wave form distortion. An additional advantage of the invention resides in the fact that it eliminates the need for a skillful testing operator when the transducer is at sea level in order to avoid damage of the connecting member. The subject invention provides a remarkably undistorted high strength acoustic signal far superior to the prior known devices.

The extent to which the subject invention attains the aforementioned objects will be better understood when the following written description is read in light of the accompanying drawings in which:

FIG. 1 is a sectional view of the preferred embodiment with a pictorial diagrammatic representation illustrating the control means therefor; and FIG. 2 is a sectional view taken along lines 2-2 of FIG. 1.

Attention is initially invited to the preferred embodiment 20 illustrated in FIG. 1 of the drawings and symbolically shown in a submerged condition beneath the surface S of a body of water. The preferred embodiment comprises first and second relatively movable body shell members 22 and 24 respectively having internal radial brace plates 23 and 25. Shell members 22 and 24 are of dome-like configuration and extend outwardly from a hollow connecting member 26 to define a main interior chamber 27. The inflatable connector member 26 is connected to each of the shell members 22 and 24 by means of a ring clamp 15 engageable with cylindrical seal members 16 extending from the upper and lower surfaces of the member 26 with tightening means being provided for clamping the ring members 15 inwardly to provide an airtight seal between the members 16 and the respective shell members 22 and 24 in an obvious manner. Obviously, other means could be employed for connecting the seal member to the shell members if such should be desired.

Dome-like body shell members 22 and 24 are of substantially conventional construction and are of the type used in Model Y-50 MT marine vibrator assemblies made by Westinghouse Air-Brake Company. Additionally, a hydraulic cylinder and piston assembly 28 having an internal piston 30 is connected between axial cap members 31 and 33 on shell members 22 and 24 respectively. Assembly 28, upon actuation for expansion, serves to move the body shell members 22 and 24 outwardly with respect to each other. The hydraulic piston and cylinder assembly 28 etc. is of the type employed in the previously mentioned Model No. Y-50 MT marine vibrator assembly manufactured by Westinghouse Air-Brake Company and forms no part of this invention; consequently these details will not be discussed further. However, it is noted that other conventional power actuated cylinder means etc. could be employed for moving shell members 22 and 24 if desired.

Moreover, it should be understood that the practice of the invention is not limited to the employment of dome-like shell members of the type aforementioned in that other movable body members such as those shown in U. S. Pat. No. 3,394,775 could also be employed in the practice of the invention as will become apparent hereinafter.

Main interior chamber 27 is defined by the inner surfaces of body shell members 22 and 24 along with the connecting member 26 with the piston and cylinder assembly 28 being oriented axially in the main interior chamber.

Connecting member 26 is made of rubber or other inflatable material and is of toroidal configuration having an inner inflatable chamber 32 from which an air hose 34 extends upwardly and outwardly through the first body shell member 22 for connection above the surface S to an air pressure regulating supply source generally designated 36 which would normally be mounted on a towing vessel or the like from which the signal source providing means 20 would be towed.

Additionally, a main interior chamber pressurizing hose line 38 extends from the first body shell member 22 for connection to the air pressure regulating supply source 36 for maintaining a desired pressure in chamber 27.

In like manner, a sensor hose line 40 having an open end adjacent the middle of the preferred embodiment and connected to the body shell member 22 by a bracket 42 or other suitable means extends upwardly to the air pressure regulating supply source 36.

Additionally, hydraulic control lines H also extend between the cylinder 28 and the towing vessel for providing actuation of the cylinder. These lines are not illustrated in their upper extent since they form no part of this invention and such would consequently merely serve to confuse the disclosure.

The air pressure supply and regulating source 36 includes a pressurized air inlet 44 connected to receive the output from a compressor for controlling the pressure in the main interior chamber 27 and the inflatable chamber 32. Inlet line 44 is connected by a line 46 to a first pressure regulator 48 which has an output line 50 connected to the main interior chamber pressurizing line 38. Line 44 is connected to sensor line 40 through a sensor control orifice nozzle 52 so that a constant flow of air is provided downwardly through line 40 to escape from the end of the line adjacent the middle portion of the preferred embodiment 20 as shown in FIG. 1.

Consequently, the depth of the preferred embodiment will determine the pressure in line 40 downstream of the nozzle 52. In other words, the pressure immediately downstream of nozzle 52 is proportional to the depth of the lower end of sensor line 40. This pressure is reflected by a gauge 54 connected in a line 56 extending to a control chamber in a second pressure regulator 58. The second pressure regulator 58 is connected by an input line 60 to the input line 44 and has an output line 62 connected via a gauge member 64 to the connector member pressure control hose 34. Similarly, a pressure sensing line 66 is connected to a control chamber in the first pressure regulator 48. Therefore, it will be seen that the output pressure in lines 50 and 62 of the regulators 48 and 58 will be directly dependent upon the pressure in line 40 immediately downstream of the control nozzle 52. Since the pressure at the aforementioned point is directly dependent upon the depth (pressure) of the end of line 40, the pressure in chambers 27 and 32 is consequently regulated in accordance with the depth of the preferred embodiment 20.

The pressure regulators 48 and 58 are adjusted so that the pressure in inflatable chamber 32 is equal to the external pressure immediately adjacent the chamber as detected by sensor hose line 40 plus the maximum pressure differential between chamber 27 and the exterior pressure as occurs during a stroke of operation of piston and cylinder assembly 28. The pressure in the main interior chamber 27 is maintained at an average level substantially equal to the external pressure detected by line 40. As a consequence of these pressure relationships which are maintained by the pressure control means 36, a highly efficient output signal is provided upon the actuation of the piston and cylinder assembly 28. This actuation drives the shell members 22 and 24 apart as was previously noted.

Numerous modifications of the preferred embodiment will occur to those skilled in the art; however, it should be understood that the spirit and scope of this invention is to be determined solely by the appended claims.

I claim:

1. An acoustic energy source means for submerged use in a body of water, said energy source means comprising first and second relatively movable body members internally defining a main interior chamber, power actuable means connecting said relatively movable body members actuable to cause rapid relative movement of said first and second relatively movable body members away from each other to create an acoustical signal in the body of water in which the energy source means is submerged, flexible inflatable connecting means having a gas filled internal closed chamber connected between said first and second relatively movable body members and means for adjustably varying the pressure of gas in said closed internal chamber to enable the obtainment of optimum signal efficiency.

2. The invention of claim 1 wherein said flexible inflatable connection means is of toroidal configuration.

3. The invention of claim 2 wherein said first and second relatively movable body members are domed, hollow shell members bulging outwardly with respect to each other from opposite sides of said inflatable connecting means to define said main interior chamber.

4. The invention of claim 3 wherein said power actuable means comprises a hydraulic cylinder assembly extending between said first and second relatively movable body members in said main interior chamber.

5. The invention of claim 4 additionally including means for varying the pressure of gas within said main interior chamber.

6. The invention of claim 3 wherein said flexible inflatable connecting means includes upper and lower cylindrical seal surfaces extending from opposite sides of said inflatable connecting means and ring clamp means engaging the outer surface of said seal means for clamping said seal means against said movable body members.

7. The invention of claim 6 wherein said power actuable means comprises a hydraulic cylinder assembly extending between said first and second relatively movable body members in said main interior chamber.

8. The invention of claim 7 additionally including means for varying the pressure of gas within said main interior chamber.

9. The invention of claim 1 wherein said first and second relatively movable body members are domed, hollow shell members bulging outwardly with respect to each other from opposite sides of said inflatable connecting means to define said main interior chamber.

10. The invention of claim 9 wherein said power actuable means comprises a hydraulic cylinder assembly extending between said first and second relatively movable body members in said main interior chamber.

11. The invention of claim 9 additionally including means for varying the pressure of gas within said main interior chamber.

12. The invention of claim 1 additionally including means for varying the pressure of gas within said main interior chamber.

13. The invention of claim 12 wherein said flexible inflatable connection means is of toroidal configuration.

* * * * *